(12) United States Patent
Rabideau (10) Patent No.: US 9,402,371 B2
(45) Date of Patent: Aug. 2, 2016

(54) PET BOWL ASSEMBLY WITH DETACHABLE LID

(71) Applicant: Joseph Rabideau, Eaton Rapids, MI (US)

(72) Inventor: Joseph Rabideau, Eaton Rapids, MI (US)

(*) Notice: Subject to any disclaimer, the term of this patent is extended or adjusted under 35 U.S.C. 154(b) by 37 days.

(21) Appl. No.: 14/471,483

(22) Filed: Aug. 28, 2014

(65) Prior Publication Data

US 2015/0059652 A1    Mar. 5, 2015

Related U.S. Application Data

(60) Provisional application No. 61/872,227, filed on Aug. 30, 2013.

(51) Int. Cl.
*A01K 5/01* (2006.01)

(52) U.S. Cl.
CPC .................... *A01K 5/0114* (2013.01)

(58) Field of Classification Search
CPC . A01K 5/0114; A01K 5/0128; A01K 5/0135; A01K 7/005; A01K 5/0142
USPC ............. 119/61.5, 61.51, 61.53, 61.54, 61.55
See application file for complete search history.

(56) References Cited

U.S. PATENT DOCUMENTS

| 2,659,345 | A |   | 11/1953 | Herbert |   |
|---|---|---|---|---|---|
| 2,815,161 | A |   | 12/1957 | Kramer |   |
| 3,498,268 | A |   | 3/1970 | Sleith et al. |   |
| 4,436,056 | A | * | 3/1984 | MacLeod | A01K 5/0135 119/61.54 |
| 4,520,633 | A |   | 6/1985 | Hoydic |   |
| 4,691,664 | A |   | 9/1987 | Crowell |   |
| D296,020 | S |   | 5/1988 | McCarroll |   |
| 5,005,524 | A |   | 4/1991 | Berry |   |
| 5,105,768 | A |   | 4/1992 | Johnson |   |
| 5,209,184 | A |   | 5/1993 | Sharkan et al. |   |
| 5,458,087 | A |   | 10/1995 | Prior et al. |   |
| 5,775,255 | A | * | 7/1998 | Louviere, III | A01K 5/0142 119/51.5 |
| 5,975,016 | A |   | 11/1999 | Wesenhagen |   |
| 5,979,361 | A |   | 11/1999 | Willinger |   |
| 6,209,487 | B1 |   | 4/2001 | Quinlan et al. |   |
| 6,516,747 | B1 | * | 2/2003 | Willinger | A01K 5/0135 119/61.54 |
| 6,843,205 | B1 |   | 1/2005 | Segreto |   |
| D523,996 | S |   | 6/2006 | Fine |   |
| D558,931 | S |   | 1/2008 | Hood et al. |   |

(Continued)

OTHER PUBLICATIONS

Printout from website: http://www.kruuse.com/en/ecom/Pet/Fodertilbeh%c3%b8r/Foder_vandsk%c3%a5le/BUSTER_foder_vand/prod_281501.aspx (Aug. 8, 2013).

*Primary Examiner* — Yvonne Abbott-Lewis
(74) *Attorney, Agent, or Firm* — Dinsmore & Shohl LLP; Douglas L. Wathen (57) ABSTRACT

A pet feeding bowl for holding food and water is provided. The pet feeding bowl has a main receptacle for holding food and water that is supported against the ground by a support structure. An auxiliary receptacle is formed by the outer surface of the main receptacle and the support structure, and may also be used for holding food and water. A first lid may be provided to cover the main receptacle, allowing food or liquid to be stored therein during travel or to prevent access to the contents of the main receptacle. A second lid may be provided to cover the auxiliary receptacle, also for the purpose of storing food or liquid. Both the first and second lids may be placed on the bottom of the pet feeding bowl to provide a non-skid, high-friction connection between the pet-feeding bowl and the support surface or ground on which it rests.

12 Claims, 8 Drawing Sheets

(56) References Cited

U.S. PATENT DOCUMENTS

| | | |
|---|---|---|
| 7,387,082 B1 | 6/2008 | Fried |
| 7,878,148 B2 | 2/2011 | Swenson et al. |
| D636,944 S | 4/2011 | Anderson et al. |
| D636,945 S | 4/2011 | Anderson et al. |
| D659,296 S | 5/2012 | Anderson |
| D670,042 S | 10/2012 | Anderson |
| 8,397,676 B2 | 3/2013 | Whitney |
| 8,474,406 B2 | 7/2013 | Weinblatt |
| D700,407 S | 2/2014 | Paschall et al. |
| 8,646,413 B2 | 2/2014 | Padia |
| 2003/0192480 A1* | 10/2003 | Bennett ................ A01K 5/0128 119/61.5 |
| 2005/0056226 A1* | 3/2005 | Ruggiero ............. A01K 5/0135 119/61.52 |
| 2007/0199512 A1* | 8/2007 | Ellis ....................... A01K 7/005 119/61.54 |
| 2012/0210941 A1* | 8/2012 | Brown ................ A01K 5/0114 119/61.52 |
| 2012/0222624 A1* | 9/2012 | Lanter ................. A01K 5/0114 119/61.52 |
| 2013/0081574 A1* | 4/2013 | Roth ....................... A01K 5/00 119/61.52 |
| 2015/0250138 A1* | 9/2015 | McKinnon ........... A01K 5/0128 119/61.5 |

\* cited by examiner

PET BOWL ASSEMBLY WITH DETACHABLE LID

CROSS REFERENCE TO RELATED APPLICATION

This application claims priority to U.S. provisional patent application Ser. No. 61/872,227, filed Aug. 30, 2013, the contents of which is incorporated herein in its entirety.

FIELD OF THE INVENTION

The present disclosure relates generally to a bowl assembly, particularly configured for feeding pets and even more particularly for feeding dogs, and more specifically to a bowl assembly with at least one detachable lid and storage thereof.

BACKGROUND OF THE INVENTION

Bowls for dog food and water are known. However, not all dogs can use the same kind of dog bowl. Typical dog food bowls are circular in shape and the dog sticks its head into the bowl to eat or drink. These bowls are often unitary pieces with no covering, so traveling with these bowls requires emptying out the food or water inside. Furthermore, dogs with long ears, such as basset hounds, often have their ears come into contact with the food or water inside the typical round bowls. This can lead to discomfort in the dogs or worse, infection.

SUMMARY OF THE INVENTION

The present disclosure provides for a dog bowl that is particularly well equipped for long-eared dogs and for traveling. In an example, the bowl has a generally ellipsoid shape defined by a width and an elongated length axis. The bowl is further provided with a main receptacle having a top opening defined by a top edge of the main receptacle. The main receptacle is capable of holding food or water therein. Surrounding the main receptacle is a support member that supports the bowl against a support surface, such as a floor. The support member may extend beyond a bottom surface of the main receptacle, forming a gap between the bottom surface of the main receptacle and the floor. The elongated shape of the bowl is configured to prevent the dog from eating or drinking with its head oriented in a direction other than in alignment with the elongated length axis. By eating along this length axis, the dog's ears fall over the side of the bowl, preventing the ears from getting dirty or infected.

In one embodiment, the bowl may have a lid that fits onto the top edge of the main receptacle and covers the top opening. This allows the bowl to be used during travel or moved without having to empty the contents of the bowl. Alternatively, the lid may fit onto a bottom portion of the main receptacle for storage while the lid is not covering the top opening, such as when the bowl is in use or when a dog is eating from the bowl. When the lid is stored on the bottom portion of the main receptacle, it may fill the gap between the bottom surface of the main receptacle and floor.

In another embodiment, the bottom surface of the bowl, the bottom of the support member, or the lid may have a high-friction surface such as rubber to prevent the bowl from moving while the dog is eating or drinking. Other features and advantages of the present disclosure will be readily appreciated as the same becomes better understood after reading the subsequent description taken in conjunction with the accompanying drawings.

BRIEF DESCRIPTION OF THE DRAWINGS

The features and advantages of the present disclosure will become more readily apparent when taken in conjunction with the following figures and illustrations.

DETAILED DESCRIPTION OF THE INVENTION

The present disclosure provides for a food bowl, particularly for feeding of dogs. The bowl can be further designed specifically to address issues associated with dogs having long and/or floppy ears that tend to fall into the eating area of a feeding bowl, for example a basset hound or the like. The bowl is also useful for travelling and is capable of storing food or water in a covered receptacle.

Figure 1A:
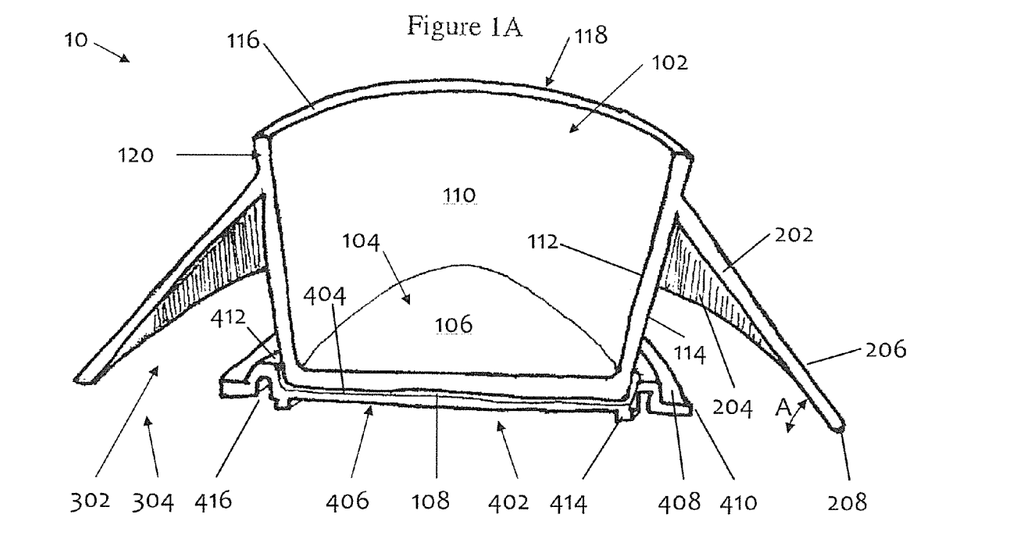
FIGS. 1A and 1B are cross-sectional views of an embodiment of a bowl in accordance with the present invention taken along the shorter width axis, with and without the lid stored on the bottom portion of the main receptacle, respectively.
Figure 1B:
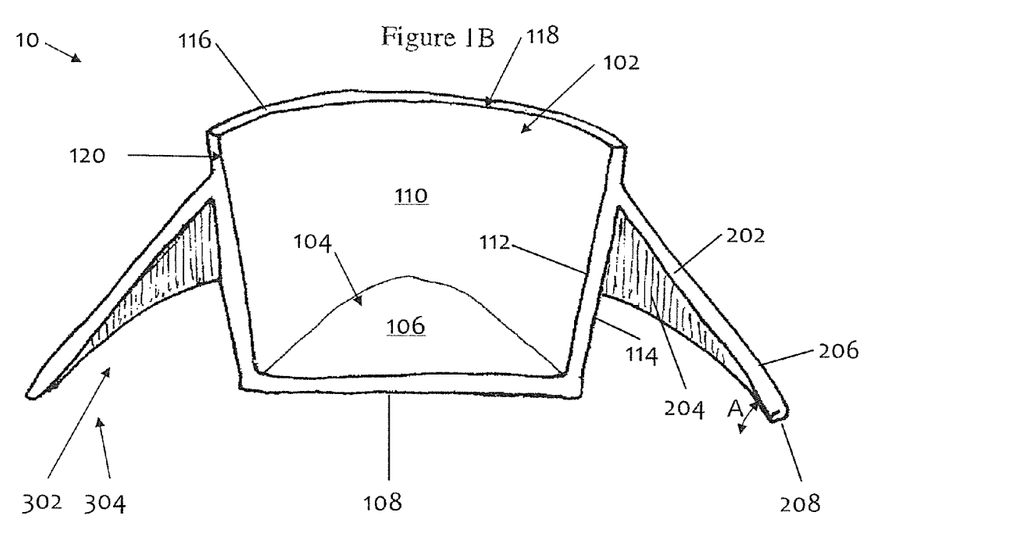

Referring to FIGS. 1A and 1B, a pet feeding bowl 10 having a main receptacle 102 is provided. Main receptacle 102 is generally provided with a bottom portion 104 having a top surface 106 and a bottom surface 108. Bottom portion 104 forms the base of the main receptacle 102. Main receptacle 102 is further provided with a side portion 110 that extends upwardly from the bottom portion 104. Side portion 110 includes an inner surface 112 and an outer surface 114, as well as a top edge 116. Top edge 116 defines top opening 118. As side portion 110 effectively forms the walls of the main receptacle 102, side portion 118 also forms a perimeter 120 of main receptacle 102. The pet feeding bowl 10 further comprises support member 202. Support member 202 is provided with an inner surface 204, an outer surface 206, and a bottom edge 208. As can be seen in the drawings, support member 202 extends from said side portion 110 below top edge 116. Support member 202 extends from side portion 110 at an angle A to a horizontal plane, such as a floor or other support surface on which the pet feeding bowl 10 rests. The angle A at which support member 202 projects from side portion 110 provides the bowl with additional stability and presents it from tipping over during travel or feeding. In some embodiments, the angle A may be in the range of 40 to 55 degrees to the horizontal plane. Furthermore, support member 202 extends from side portion 110 about the perimeter 120 of main receptacle 102. That is, support member 202 extends continuously from side portion 110, effectively surrounding main receptacle 102. In some embodiments, support member 202 extends beyond bottom surface 108 of bottom portion 104. In such an embodiment, bottom edge 208 is positioned below bottom surface 108 of bottom portion 104. That is, bottom edge 208 is in contact with the floor or support surface on which the pet feeding bowl 10 rests. In such an embodiment, a gap between the floor or support surface and bottom surface 108 of bottom portion 104 may be present. The inner surface 204 of support member 202 and the outer surface 114 of side portion 110 also form a secondary, auxiliary receptacle 302. As can be seen in FIGS. 1A and 1B, side portion 110 and bottom portion 104 of main receptacle 102 extend into auxiliary receptacle 302. Bottom edge 208 of support member 202 defines an opening 304 of auxiliary receptacle 302. As shown in FIGS. 1A and 1B, the side portion 110 is generally vertical, but is angled outwardly somewhat with respect to absolute vertical. In some examples, the inner surface 112 is angled outwardly at about 5.4 degrees with respect to vertical, though other angles may be used. This angle makes the width and length of the bottom surface 108 smaller than if the side portion 110 was completely vertical, for a given size top opening 118. This helps allow the lid to fit on the top or bottom.

The pet feeding bowl 10 may further comprise a first lid 402. First lid 402 is provided with a top surface 404, a bottom surface 406, and a flange 408 that defines the outer edge 410 of the lid 402. Top surface 404 is further provided with a first ridge 412 that projects in an upward direction from the top surface 404. Said bottom surface 406 is further provided with a second ridge 414 that projects downwardly from the bottom surface 406, as well as a cavity 416 that is positioned between the flange 408 and the second ridge 414. The first lid 402 is adapted to cover top opening 118 of main receptacle 102. In such an embodiment, first lid 402 is placed over top opening 118 of main receptacle 102 such that elliptic cavity 416 receives top edge 116 of side portion 110 therein. The first lid 402 provides a snug fit about top edge 116, and covers top opening 118 such that the pet feeding bowl 10 may be moved or used in a travel environment without having to empty the food, water, or other contents contained in main receptacle 102. The first lid 402 is further adapted to be placed on the bottom portion 104 of main receptacle 102. In an embodiment such as this, bottom surface 108 of bottom portion 104 is placed upon top surface 404 of first lid 402. First ridge 412 of top surface 404 of first lid 402 fits around the outer surface 114 of side portion 110; specifically, first ridge 412 fits around a portion of the outer surface 114 that is adjacent to the bottom portion 104 of main receptacle 102. When first lid 402 is placed on bottom portion 104 of main receptacle 102, the gap formed between bottom surface 108 of bottom portion 104 and the floor or other support surface on which the pet feeding bowl 10 rests may be substantially filled. That is, first lid 402, and more specifically second ridge 414, contacts the ground or other support surface and supports pet feeding bowl 10. In some embodiments in which first lid 402 comprises rubber or another high-friction material, placing first lid 402 on bottom surface 108 of bottom portion 104 provides a non-slip contact between the pet feeding bowl 10 and the floor or other support surface. This prevents pet feeding bowl 10 from sliding or moving undesirably during normal use or in a travel environment.

Figure 2A:
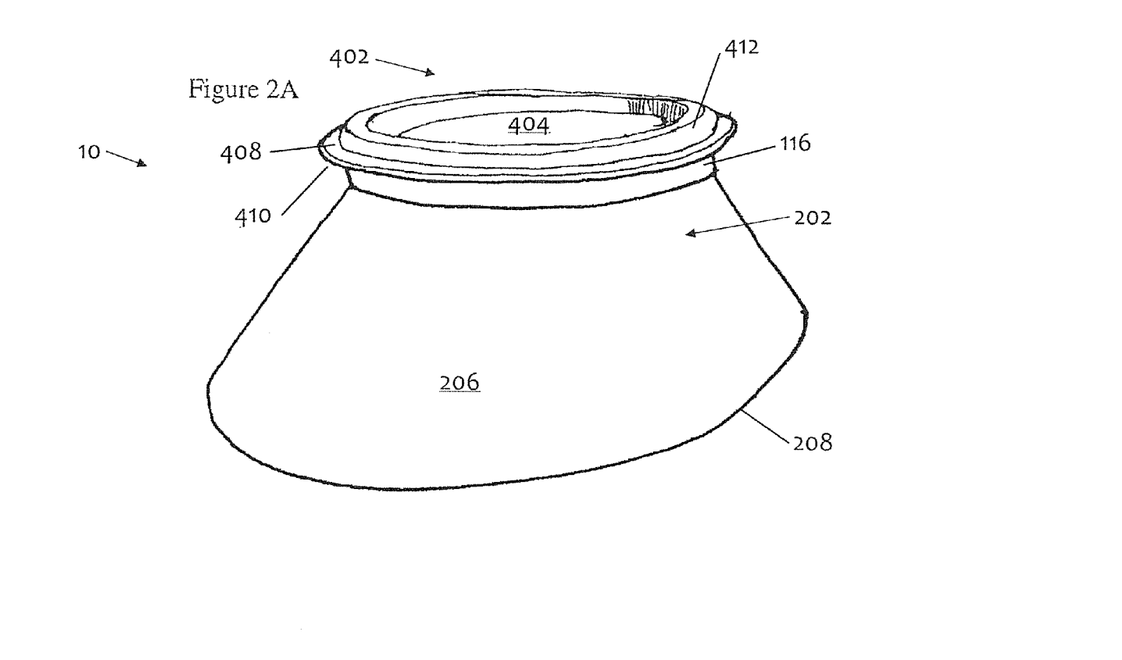
FIGS. 2A and 2B are front perspective views of a bowl in accordance with the present invention with and without the lid covering the top opening, respectively.
Figure 2B:
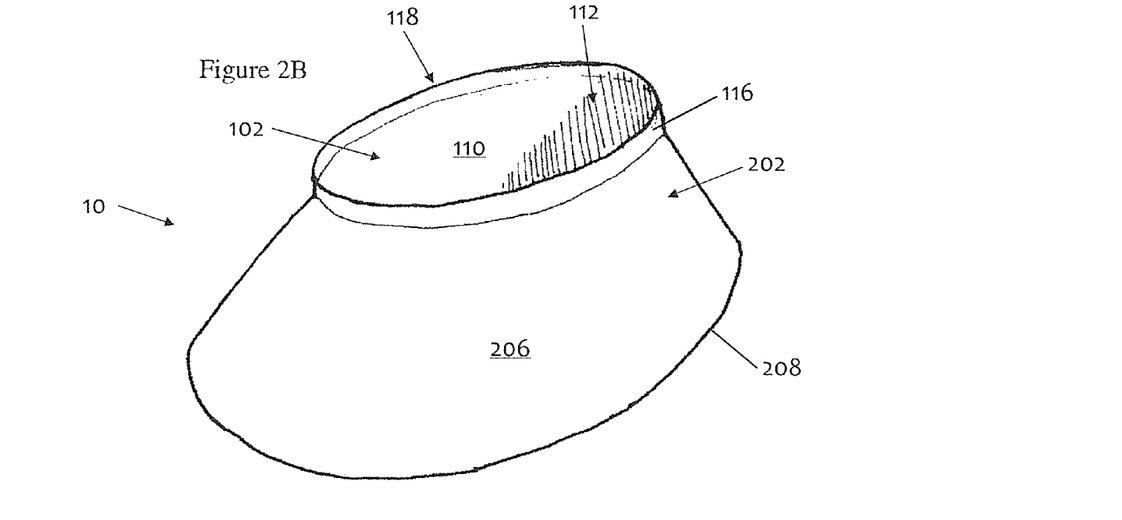
Figure 3A:
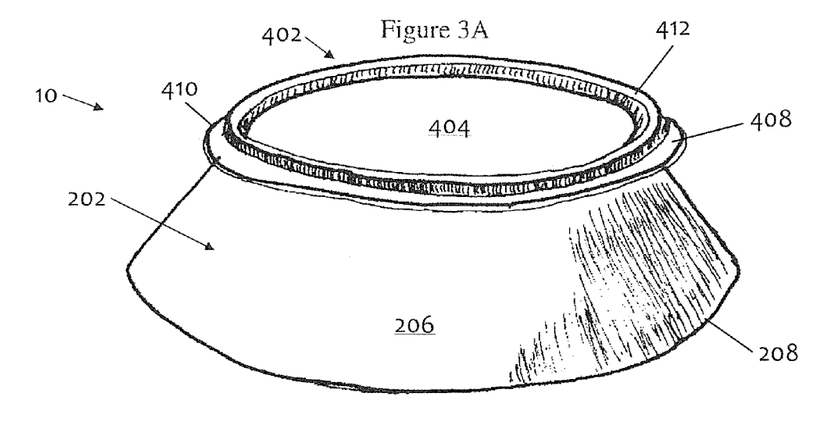
FIGS. 3A and 3B are side perspective views of a bowl in accordance with the present invention with and without the lid covering the top opening, respectively.
Figure 3B:
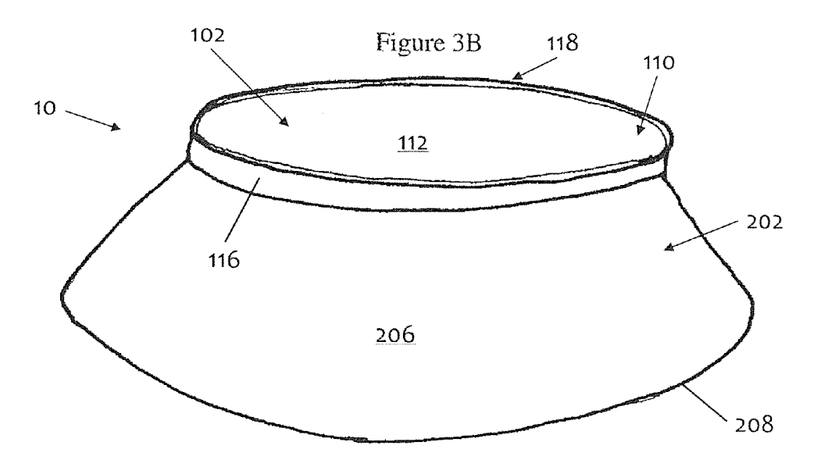

Referring now to FIGS. 2A, 2B, 3A, and 3B, a pet feeding bowl 10 in front and side perspective views is provided. FIGS. 2A and 3A illustrate outer surface 206 of support member 202, with bottom edge 208 supporting the pet feeding bowl 10 on the ground or other support surface on which pet feeding bowl 10 rests. Top edge 116 can also be seen with first lid 402 positioned thereon. Top surface 404, first ridge 412, and flange 408 of first lid 402 can be also be seen in FIGS. 2A (and 3A). FIGS. 2B and 3B illustrate pet feeding bowl 10 without first lid 402 disposed upon top edge 116 and covering top opening 118 of main receptacle 102. This exposes inner surface 112 of side portion 110.

Figure 4A:
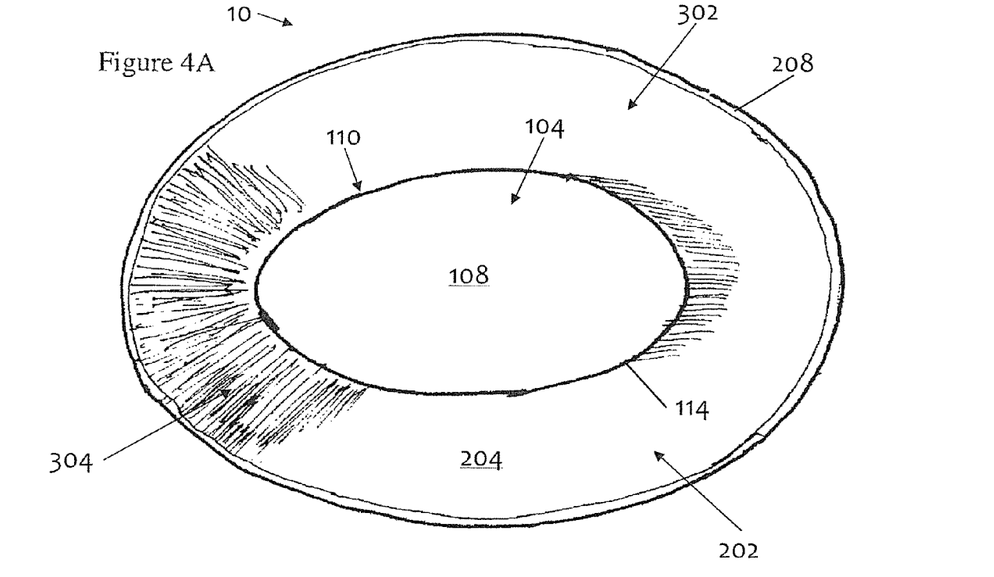
FIGS. 4A and 4B are bottom and top views of a bowl in accordance with the present invention, respectively.
Figure 4B:
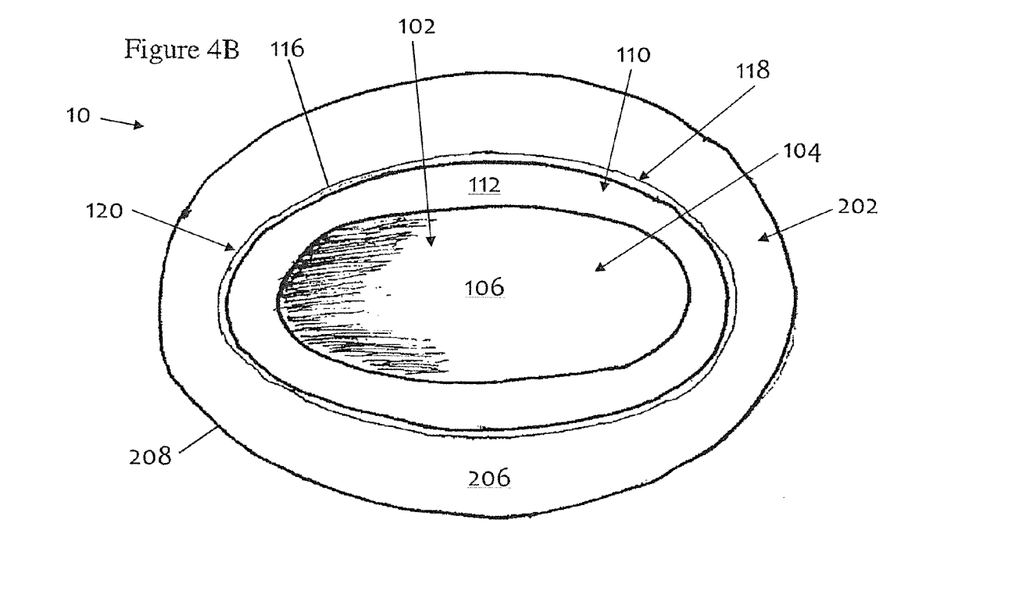

Referring now to FIGS. 4A and 4B, a pet feeding bowl 10 is provided in bottom and top views. FIG. 4A represents the view a user may have if filling auxiliary receptacle 302 with food or water around outer surface 114 of side portion 110. That is, pet feeding bowl 10 can be seen as viewed from below, looking directly at bottom surface 108 of bottom portion 104. The outline of auxiliary receptacle 302 is visible, as defined by outer surface 114 of side portion 110 and inner surface 204 of support member 202. Bottom edge 208 of support member 202 defines opening 304 of auxiliary receptacle 302. FIG. 4B illustrates the view a user may have of pet feeding bowl 10 if placing food or water into main receptacle 102 through top opening 118. The food or water with which main receptacle 102 was filled would contact top surface 106 of bottom portion 104, as well as inner surface 112 of side portion 110. Top edge 116 defines top opening 118; similarly, perimeter 120 is defined by side portion 110. As support member 202 extends from side portion 110 at an angle to the horizontal, outer surface 206 of support member is visible, with bottom edge 208 supporting pet feeding bowl 10 against the ground or another support surface.

Figure 5A:
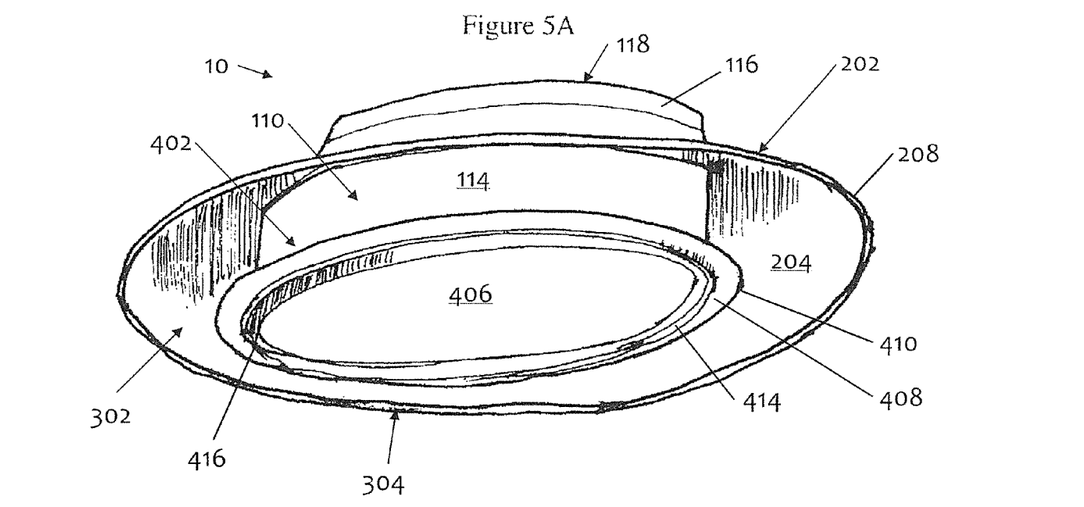
FIGS. 5A and 5B are bottom perspective views of a bowl in accordance with the present invention with and without the lid stored on the bottom portion of the main receptacle, respectively.
Figure 5B:
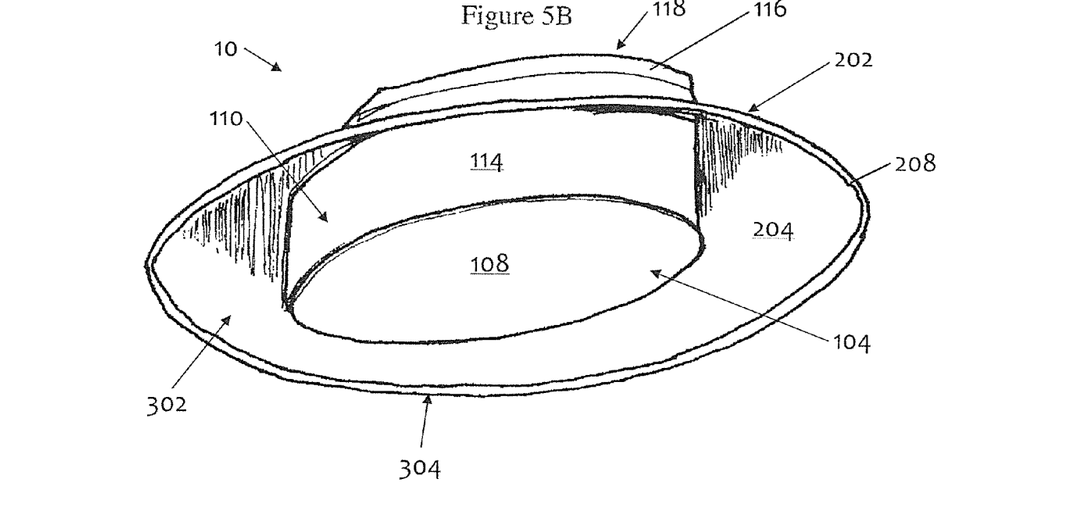

Referring now to FIGS. 5A and 5B, a pet feeding bowl 10 is provided in bottom perspective views. FIG. 5B shows pet feeding bowl 10, with auxiliary receptacle 302 defined by outer surface 114 of side portion 110 and inner surface 204 of support member 202. Bottom edge 208 defines the opening 304 of auxiliary receptacle 302. Bottom surface 108 of bottom portion 104 can be seen projecting into auxiliary receptacle 302. Top edge 116 of side portion 110 defines top opening 118. FIG. 5A shows a pet feeding bowl in the same perspective as FIG. 5B, but with first lid 402 in the storage position such that bottom surface 406 of first lid 402 hides bottom surface 108 of bottom portion 104 from view. Outer edge 410 is defined by flange 408, which is abutted by cavity 416. Second ridge 414 is disposed adjacent cavity 416 and projects from bottom surface 406. When first lid 402 is positioned on the bottom surface 108 of bottom portion 104, first lid 402, and more specifically second ridge 414, fill the gap between bottom surface 108 and the ground or supporting surface formed when bottom edge 208 of support member 202 supports pet feeding bowl 10. Therefore, second ridge 414 of first lid 402 supports pet feeding bowl 10 in such an embodiment. When first lid 402 comprises a high-friction material or surface, first lid 402 may prevent pet feeding bowl 10 from moving or sliding when first lid 402 is placed on the bottom surface 108 of bottom portion 104.

Figure 6A:
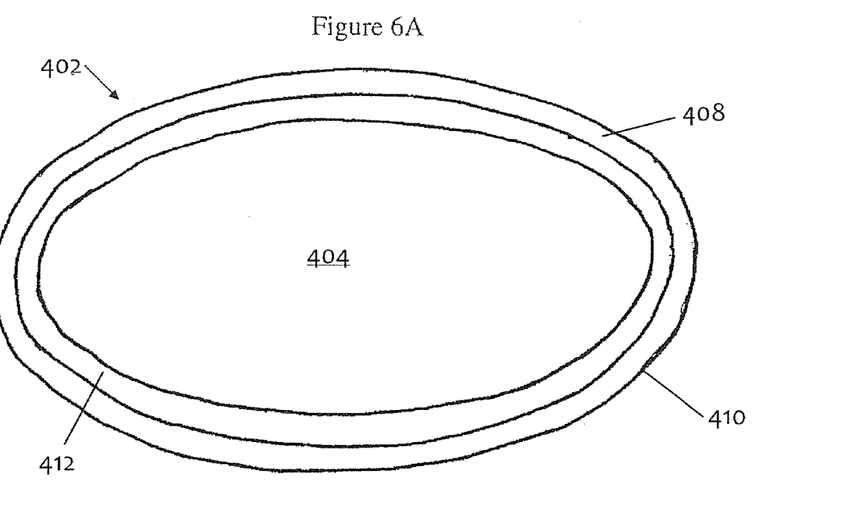
FIGS. 6A and 6B are top and bottom views of a first lid in accordance with the present invention, respectively.
Figure 6B:
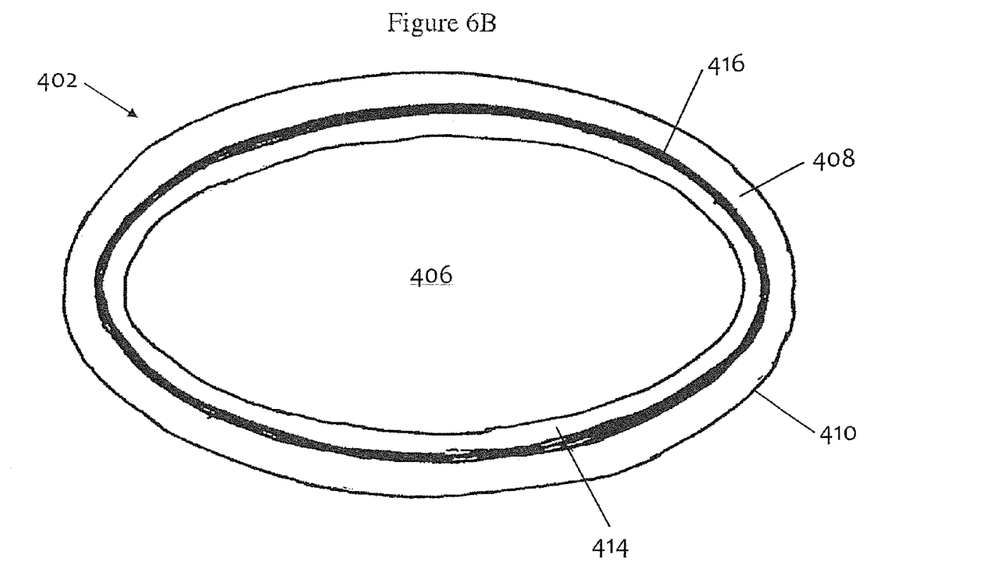

Referring now to FIGS. 6A and 6B, top and bottom views of first lid 402 are provided. FIG. 6A shows top surface 404 with first ridge 412 projecting therefrom. Outer edge 410 is defined by flange 408, which abuts first ridge 412. When first lid 402 is positioned on the bottom portion 104 of pet feeding bowl 10, bottom surface 108 is received by top surface 406, and first ridge 412 wraps around outer surface 114 of side portion 110 proximal to bottom portion 104. FIG. 6B shows bottom surface 406 with second ridge 414 projecting therefrom, wherein second ridge 414 is abutted by cavity 416. The underside of flange 408 and outer edge 410 are visible. When first lid 402 is positioned to cover top opening 118 of main receptacle 102, top edge 116 of side portion 110 is received in cavity 416 of first lid 402, sealing main receptacle 102 to prevent the spilling of liquid, food, or other contents therefrom.

Figure 7A:
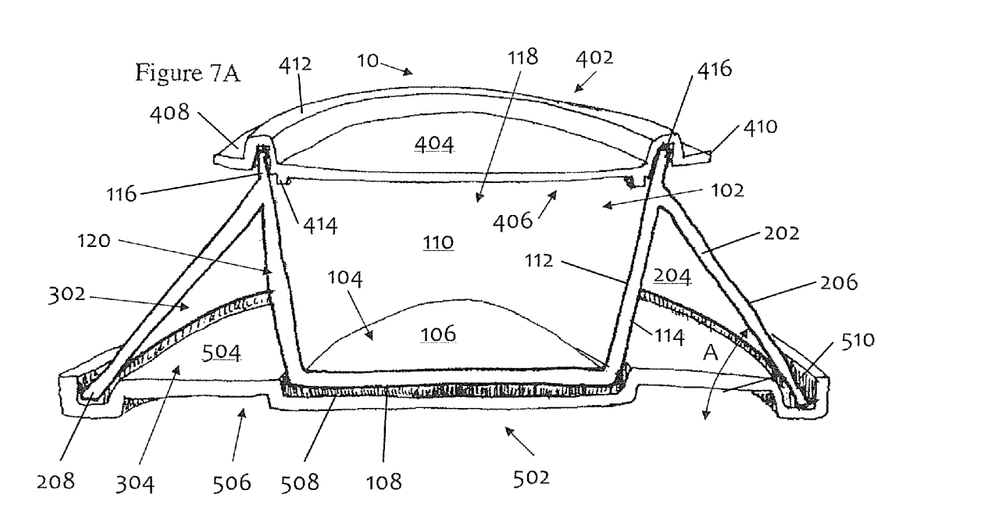
FIG. 7A is a cross-sectional view of a bowl in accordance with the present invention taken along the shorter width axis with the first lid covering the top opening of the main receptacle and a second lid covering the auxiliary receptacle and bottom portion of the main receptacle.
Figure 7B:
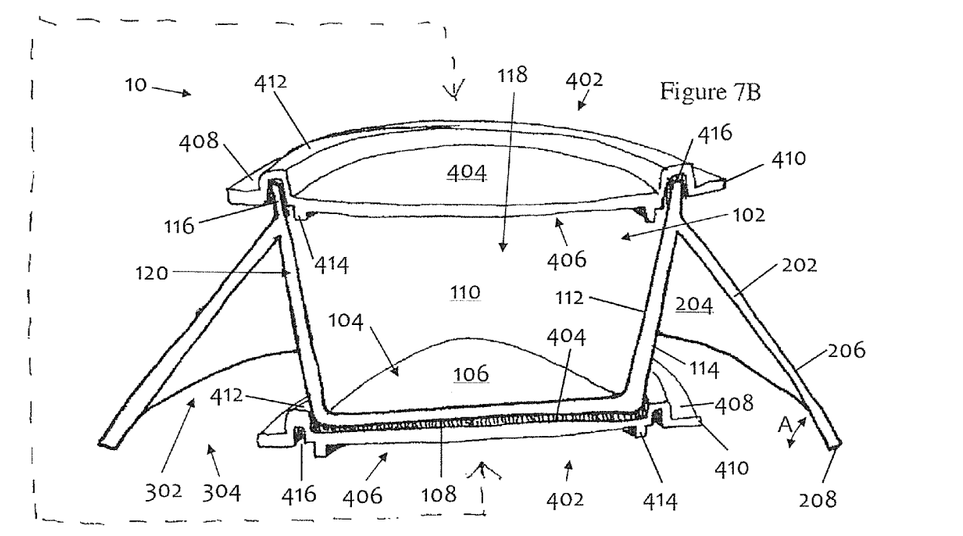
FIG. 7B is a cross-sectional view of a bowl in accordance with the present invention taken along the shorter width axis with the first lid covering the top opening of the main receptacle and an additional first lid covering the bottom portion of the main receptacle.

FIGS. 7A and 7B show cross-sectional views taken along the shorter width axis of pet feeding bowl 10 with various lid combinations in use. FIG. 7A shows pet feeding bowl 10 with first lid 402 positioned to cover top opening 118 of main receptacle 102, wherein main receptacle 102 is defined by top surface 106 of bottom portion 104 and inner surface 112 of side portion 110. Top edge 116 of side portion 110 is received in cavity 416, securing first lid 402 to pet feeding bowl 10. As can be seen in the cut-away view, cavity 416 further defines first ridge 412 of top surface 404. Second ridge 414 projects from bottom surface 406 into main receptacle 102, and flange 408 and outer edge 410 wrap around perimeter 120 defined by side portion 110. Also in FIG. 7A, a second lid 502 is shown. Second lid 502 is positioned on the bottom of pet feeding bowl 10 and covers opening 304 of auxiliary receptacle 302. Auxiliary receptacle 302 is defined by inner surface 204 of support member 202 and outer surface 114 of side portion 110. Second lid 502 has a top surface 504 and a bottom surface 506 and is further provided with a depression 508 and a cavity 510. When second lid is positioned to cover opening 304 of auxiliary receptacle 302, bottom surface 108 of bottom portion 104 is received by depression 508, and bottom edge 208 of support member 202 is received in cavity 510. Cavity 510 wraps around both inner surface 204 and outer surface 206 of support member 202. When second lid 502 is positioned to cover opening 304 of auxiliary receptacle 302, second lid 502 fills the gap between bottom surface 108 and the ground or supporting surface formed when bottom edge 208 of support member 202 supports pet feeding bowl 10. Therefore, bottom surface 506 of second lid 502 supports pet feeding bowl 10 in such an embodiment. When second lid 502 comprises a high-friction material or surface, second lid 502 may prevent pet feeding bowl 10 from moving or sliding when in use or in a travel environment. FIG. 7B is substantially similar to FIG. 7A, but with an additional first lid 402 positioned on the bottom surface 108 of bottom portion 106. The description of FIG. 1A describes how first lid 402 is positioned in such an embodiment.

Figure 8:
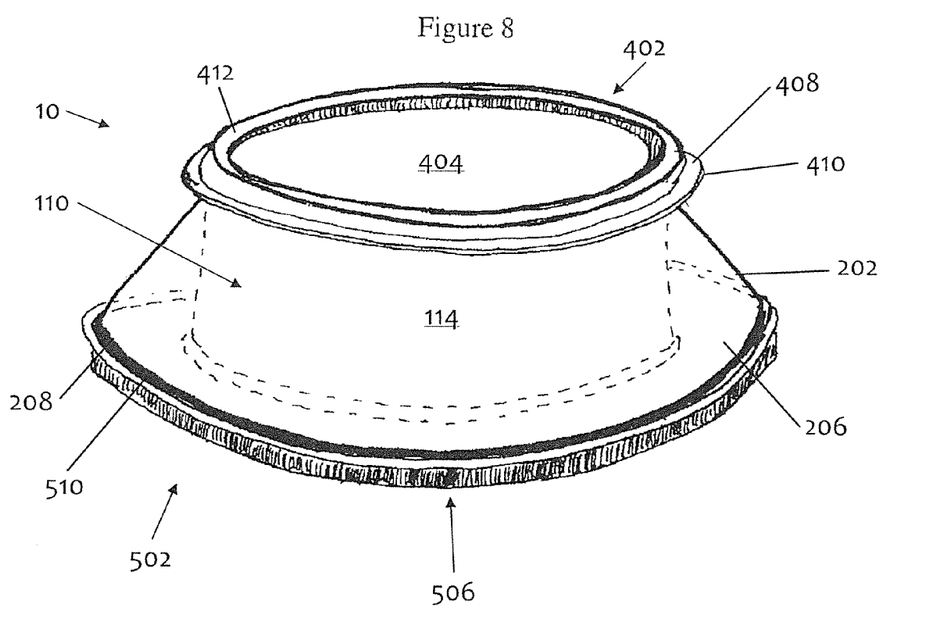
FIG. 8 is side perspective view of a bowl in accordance with the present invention with the first lid covering the top opening of the main receptacle and the second lid covering the auxiliary receptacle and the bottom portion of the main receptacle.

FIG. 8 provides a side perspective view of pet feeding bowl 10 with the first lid 402 covering the top opening 118 of main receptacle 102, and the second lid 502 covering the opening 304 of auxiliary receptacle 302. Top surface 404 is surrounded by first ridge 412, flange 408, and outer edge 410 of first lid 402. Outer surface 206 forms the visible portion of support member 202, which extends from outer surface 114 of side portion 110 at an angle to the horizontal plane and terminates at bottom edge 208. Bottom edge 208 is received in cavity 510 of second lid 502. In such an embodiment, bottom surface 506 of second lid 502 supports pet feeding bowl 10 against the ground or other support surface.

In one embodiment, food or liquid may be placed in main receptacle 102, and top opening 118 of main receptacle 102 may be sealed off by positioning first lid 402 to cover top opening 118 as described above. Such an embodiment prevents the contents of main receptacle 102 from spilling while transporting the pet feeding bowl 10 or while using the bowl in a travel environment. When the pet feeding bowl 10 is ready to be used for feeding, first lid 402 may be removed so that top opening 118 is revealed and the contents of main receptacle 102 are accessible to a pet for feeding. When first lid 402 is removed from top opening 118, it may be placed on the bottom portion 104 of main receptacle 102, specifically such that it covers bottom surface 108 of bottom portion 104. In such an embodiment, first lid 402 fills the gap between bottom surface 108 and the ground or support surface on which pet feeding bowl 10 rests. Therefore, first lid 402 may support pet feeding bowl 10 against the ground, and in embodiments in which first lid 402 comprises a high-friction surface or material, may prevent pet feeding bowl 10 from sliding on a support surface or from tipping over.

In an alternative embodiment, food or liquid may be placed in auxiliary receptacle 302, and opening 304 of auxiliary receptacle 302 may be sealed off by positioning second lid 502 to cover opening 304. An embodiment such as this allows for additional food or water to be stored using pet feeding bowl 10. Such an embodiment also allows for auxiliary receptacle 302 to be used for feeding. When such a function is desirable, second lid 502 may be removed to reveal opening 304 of auxiliary receptacle 302. The additional food or liquid stored therein may then be transferred to main receptacle 102. Additionally, the additional food or liquid may be directly accessed by the pet in auxiliary receptacle 302 by positioning pet feeding bowl 10 such that auxiliary receptacle 302 is accessible by the pet. Such functionality may be achieved by positioning pet feeding bowl 10 such that top edge 116 of side portion 110 supports the pet feeding bowl 10 against the ground. When second lid 502 no longer covers opening 304 of auxiliary receptacle 302, the food or water therein may be accessed by the pet. Such an embodiment also allows for first lid 402 to remain in a position in which it covers top opening 118. In this case, pet feeding bowl 10 may be supported on the ground or other support surface by first ridge 412 projecting from top surface 404 of first lid 402. Food or water may be still be stored in main receptacle 102 in such an embodiment.

Liquid contained in auxiliary receptacle 302 may also be frozen or chilled in order to cool the contents of main receptacle 102. In such an embodiment, auxiliary receptacle 302 may be filled with liquid prior to use, and pet feeding bowl 10 may then be placed in a freezer or other cold container to allow the liquid to chill or to freeze. Once the liquid contained in auxiliary receptacle 302 has reached the desired temperature, pet feeding bowl 10 may be removed from the freezer or other cold container. Second lid 502 may be positioned to cover opening 304 before placing pet feeding bowl 10 in the cold container or freezer, or at the time that the pet feeding bowl 10 is removed from the cold container or freezer. Then, main receptacle 102 may be filled with a liquid, such as water for a pet, or any other contents that a user desires to chill. The presence of the cold or frozen liquid in auxiliary receptacle 302 thereby chills the contents of main receptacle 102.

In one embodiment, auxiliary receptacle 302 may be used by inverting the pet feeding bowl 10 and placing it on the ground or support surface on which it rests. In an inverted position, top edge 116 of side portion 110 is located at the bottom of the pet feeding bowl 10, and may support the pet feeding bowl 10 against the ground or other support surface. In such an embodiment, bottom edge 208 would be positioned at the top of pet feeding bowl 10. Alternatively, if the first lid 402 is in a position such that it is covering top opening 118, first ridge 412 of first lid 402 may support the pet feeding bowl 10 against the ground or other support surface. All references to top, bottom, the horizontal plane, and other relative spatial terms refer to the positions shown in FIGS. 1A and 1B. However, one of ordinary skill in the art will recognize that that the invention as described may be practiced in a variety of different orientations and relative spatial configurations.

In another embodiment, first lid 402 may be used to cover top opening 118 of main receptacle 102 and second lid 502 may be used to cover opening 304 of auxiliary receptacle 302 simultaneously. In such an embodiment, both first receptacle 102 and auxiliary receptacle 302 may be used to store food or water simultaneously, and either first lid 402 or second lid 502 may be removed to allow access to food or water stored therein. Such an embodiment also allows for first lid 402 or second lid 502 to support pet feeding bowl 10 against the ground depending on the orientation in which pet feeding bowl 10 is being used.

In yet another embodiment, two separate first lid 402 components may be used simultaneously, such that one first lid 402 is positioned to cover top opening 118 of main receptacle 102 and another first lid 402 is used to cover bottom surface 108 of bottom portion 104. Such an embodiment allows for food or water to be stored in a main receptacle 102 covered by first lid 402 while still having the added benefit of an additional first lid 402 supporting the pet feeding bowl 10 against the ground or other support surface. When first lid 402 comprises a high-friction material or surface, such an embodiment may perform well in a travel environment, as the pet feeding bowl 10 would be prevented from sliding, and the contents therein would be prevented from spilling out. Similar functionality may be obtained by replacing the additional first lid 402 with a second lid 502 on the bottom of the pet feeding bowl 10. Such an embodiment provides the added benefit of allowing additional food or water to be stored in auxiliary receptacle 302.

Other embodiments may also be implemented, such as the use of only the first lid 402 in a position to either cover top opening 118 of main receptacle 102 or cover bottom surface 108 of bottom portion 102. Additionally, use of only second lid 502 to support pet feeding bowl 10 against the ground or other support surface may also be implemented. In some embodiments, neither first lid 402 nor second lid 502 may be used at all.

In one embodiment described herein, the pet feeding bowl 10 has a generally elliptic shape. However, this elliptic geometry is not limited to a mathematically defined ellipse, but more broadly refers to a generally ellipsoid or ovoid shape. A bowl provided with a generally curved geometry having a length axis that is longer than a width axis embodies the present invention, although other embodiments having geometries that are partially curved or have no curved surfaces at all are also possible. The ratios between the length and width dimensions of such geometries may also vary such that that the length and width dimensions are equal or about equal.

In some embodiments, the pet feeding bowl 10 and its various components are provided with a generally elongated geometry. In such embodiments, the pet feeding bowl 10 and the components associated therewith may be provided with a length dimension and a width dimension, wherein the length dimension is longer than the width dimension. In some embodiments, the length dimension is at least one and one third times greater than the width dimension. In other embodiments, the length dimension may be about one and one half times the width dimension, or about double the width dimension. In one embodiment, the top opening 118 of main receptacle 102 has a length dimension of about 7 inches and a width dimension of about 3.5 to 3.75 inches, and the opening 304 of auxiliary receptacle 302 has a length dimension of about 10.75 inches and a width dimension of about 7.25 inches.

It is contemplated that various size and shape modifications can be made to the present disclosure to accommodate different sized dogs or to achieve different functionalities and aesthetic characteristics. The depth of the bowl can be configured to prevent the mouth of the dog from reaching the bottom when approaching the bowl from the shorter width axis since the dog's nose will not sufficiently fit within the opening. Additionally, the present disclosure may be modified to accommodate implementing the present invention in a variety of geometries. In one preferred embodiment, the pet feeding bowl, first lid, second lid, and other components of the present invention sharing the same general profile may have an elliptical shape. Other geometric embodiments not necessarily limited to those having a length dimension larger than a width dimension may also be practiced in accordance with the present invention. In some preferred embodiments, the width of the bowl is no more than 5 inches and no less than 3 inches. In other preferred embodiments, the width is in the range of 3.25 to 3.75 inches. In some preferred embodiments, the length to width ratio is at least 1.5:1. In other preferred embodiments, the ratio is at least 1.75:1. This combination of a narrow width and a length substantially greater than the width encourages a dog to eat from the bowl lengthwise rather than widthwise. A dog may be said to have a head axis or direction running from the back to the front of the head, such as from the back of the skull to the nose. The shape of the bowl will encouraged the dog to align their head axis more with the lengthwise axis of the bowl than with the widthwise axis.

For the purposes of this disclosure, all references to lengths, widths, depths, ratios between measurements of components of the present invention relative to other components of the present invention or of the surrounding environment, and spatial orientations are meant to serve as example embodiments of the present invention and are non-limiting. One of skill in the art would recognize that the invention as described may be practiced in various embodiments having differing sizes, shapes, and orientations.

Many modifications and variations of the present invention are possible in light of the above teachings and may be practiced otherwise than as specifically described while still within the scope of the invention.

What is claimed is:

1. A pet feeding bowl comprising:
 a main receptacle having a bottom portion, a side portion provided with a top edge, said side portion extending upwardly from said bottom portion, and a top opening defined by said top edge of said side portion;
 a support member surrounding said main receptacle, said support member originating from said side portion and extending below said bottom portion of said main receptacle at an angle to a horizontal plane;
 a first lid having a top surface, a bottom surface, and a flange defining an outer edge of said first lid, said top surface having a first ridge projecting upwardly from said top surface, said bottom surface having a second ridge projecting downwardly from said bottom surface, said bottom surface further provided with a cavity disposed between said flange and said second ridge, wherein said cavity is adapted to receive said top edge of said side portion therein such that said lid covers said top opening of said main receptacle, said first lid further adapted to receive said bottom portion of said main receptacle, such that said first ridge of said first lid surrounds said side portion of said main receptacle adjacent to said bottom portion; and
 a second lid having a top surface and a bottom surface, said second lid provided with a depression and a cavity, wherein said depression is adapted to receive said bottom portion of said main receptacle, and said cavity is adapted to receive said support member below said bottom portion.

2. The pet feeding bowl of claim 1, wherein:
said first lid and said second lid comprise a non-skid material.

3. The pet feeding bowl of claim 2, wherein:
said second ridge of said first lid projects beyond said support member extending below said bottom portion of said main receptacle when said first lid receives said bottom portion of said main receptacle.

4. The pet feeding bowl of claim 1, wherein:
said main receptacle, said top opening, said first lid, and said second lid are each provided with an elongated geometry.

5. The pet feeding bowl of claim 4, wherein:
said elongated geometry includes a length dimension and a width dimension, said length dimension measuring at least 1.5 times said width dimension and the width is in the range of 3 to 5 inches.

6. A pet feeding bowl comprising:
a main receptacle having a bottom portion, a side portion having an inner surface and an outer surface, said side portion extending upwardly from said bottom portion, wherein said side portion is further provided with a top edge, an top opening defined by said top edge of said side portion, and a perimeter defined by said side portion;
a support member having an inner surface, an outer surface, and a bottom edge, said support member extending outwardly from said side portion about said perimeter such that said support member surrounds said main receptacle, said support member originating from said side portion below said top edge of said side portion, said bottom edge of said support member extending below said bottom portion of said main receptacle, said support member extending at an angle to a horizontal plane;
an auxiliary receptacle defined by said inner surface of said support member and said outer surface of said side portion, said auxiliary receptacle provided with an opening defined by said bottom edge of said support member; and
a first lid adapted to cover said top opening of said main receptacle, said first lid receiving said top edge of said main receptacle, said first lid further adapted to receive said bottom portion of said main receptacle.

7. The pet feeding bowl of claim 6, wherein:
said main receptacle and said auxiliary receptacle are each provided with an elongated geometry.

8. The pet feeding bowl of claim 7, wherein:
said elongated geometry includes a length dimension and a width dimension, said length dimension measuring at least one and one third times said width dimension.

9. The pet feeding bowl of claim 6 further comprising
a second lid adapted to cover said opening of said auxiliary receptacle, said second lid receiving said bottom edge of said support member.

10. A pet feeding bowl comprising:
an ellipsoid main receptacle having a bottom portion provided with a top surface and a bottom surface, a side portion extending upwardly from said bottom portion, said side portion having an inner surface and an outer surface wherein said side portion is further provided with a top edge, an elliptic top opening defined by said top edge of said side portion, and a perimeter defined by said side portion;
a support member having an inner surface and an outer surface, and a bottom edge, said support member extending outwardly from said side portion about said perimeter, said support member originating from said side portion below said top edge of said side portion, said bottom edge of said support member extending below said bottom portion of said main receptacle, said support member extending at an angle to a horizontal plane;
an ellipsoid auxiliary receptacle having defined by said inner surface of said support member and said outer surface of said side portion, said ellipsoid auxiliary receptacle provided with an elliptic opening defined by said bottom edge of said support member;
a first elliptic lid having a top surface, a bottom surface, and a flange defining an outer edge of said first elliptic lid, said top surface having a first elliptic ridge projecting upwardly from said top surface, said bottom surface having a second elliptic ridge projecting downwardly from said bottom surface, said bottom surface further provided with an elliptic cavity disposed between said flange and said second elliptic ridge, wherein said elliptic cavity is adapted to receive said top edge of said side portion therein such that said first elliptic lid covers said elliptic top opening, said first elliptic lid further adapted to receive said bottom surface of said bottom portion, such that said first elliptic ridge of said first elliptic lid surrounds a portion of said outer surface of said side portion that is adjacent to said bottom surface of said bottom portion; and
a second elliptic lid having a top surface and a bottom surface, said second elliptic lid provided with a elliptic depression and an elliptic cavity, wherein said elliptic cavity is adapted to receive said bottom edge of said support member such that said second elliptic lid covers said elliptic opening of said ellipsoid auxiliary receptacle, said second elliptic lid further adapted to receive said bottom surface of said bottom portion in said elliptic depression.

11. The pet feeding bowl of claim 10 wherein:
said first elliptic lid and said second elliptic lid comprise a non-skid material.

12. The pet feeding bowl of claim 10 wherein:
said support member surrounds said elliptic main receptacle.

* * * * *